United States Patent [19]

Wakatani

[11] Patent Number: 5,060,141
[45] Date of Patent: Oct. 22, 1991

[54] MULTIPROCESSOR SYSTEM HAVING UNIDIRECTIONAL COMMUNICATION PATHS

[75] Inventor: Akiyoshi Wakatani, Osaka, Japan

[73] Assignee: Matsushita Electric Industrial Co., Inc., Osaka, Japan

[21] Appl. No.: 291,209

[22] Filed: Dec. 28, 1988

[30] Foreign Application Priority Data

Dec. 29, 1987 [JP] Japan .................. 62-334484

[51] Int. Cl.⁵ .................. G06F 1/00
[52] U.S. Cl. .................. 364/200
[58] Field of Search .................. 364/200, 900

[56] References Cited

U.S. PATENT DOCUMENTS

| 4,325,120 | 4/1982 | Colley et al. | 364/200 |
| 4,393,642 | 7/1990 | Blank | 364/200 |
| 4,533,993 | 8/1985 | McCanny et al. | 364/200 |
| 4,553,203 | 11/1985 | Rau et al. | 364/200 |
| 4,740,894 | 4/1988 | Lyon | 364/200 |
| 4,943,909 | 7/1990 | Huang | 364/200 |

Primary Examiner—Douglas W. Olms
Assistant Examiner—Temesghen Samuel
Attorney, Agent, or Firm—Lowe, Price, Leblanc & Becker

[57] ABSTRACT

A multiprocessor system is formed of a total of $R^n$ digital processors connected for mutual communication by unidirectional data lines. Each processor is connected for sending data to R other processors, and designating the address of an arbitrary processor as $(P_1 P_2, \ldots P_i, \ldots P_n)$, the addresses of respective ones of these R processors are determined by executing a one digit right shift (or left shift) of that arbitrary processor address and changing a specific digit $P_i$ of that address to each of a set of values extending from 0 to $(R-1)$.

2 Claims, 4 Drawing Sheets

MULTIPROCESSOR SYSTEM HAVING UNIDIRECTIONAL COMMUNICATION PATHS

BACKGROUND OF THE INVENTION

The present invention relates to a multiprocessor system configured as a network containing a plurality of digital processors connected for mutual communication.

FIG. 1 is a block diagram for illustrating the basic principles of a prior art multiprocessor system, showing a portion of a generalized system. An arbitrarily selected digital processor (referred to in the following as a processing element) 29 is connected by respective bidirectional data lines such as lines 33 to 38 to a plurality of other processing elements, six of which are shown designated by numerals 26 to 32 respectively. Each of the processing elements is identified by a specific address which consist of a set of n digits (where n is an integer which is >1) designated as $P_1, P_2, \ldots P_n$. FIG. 2 shows a specific example of such a prior art multiprocessor system, in which the processing elements are respectively designated by numerals 39 to 54, with respective addresses of (0,0,0,0) to (1,1,1,1). The number of processing elements in such a system, designated in the following as N, is given as $N = R^n$, where the base R is an integer which is greater than or equal to 2. With the multiprocessor system of FIG. 2, n is equal to 4 and R is equal to 2, i.e. this is a binary multiprocessor system having $2^4$ (=16) processing elements. Since each address has n digits, each of these digits is also determined to the base R, i.e. in the example of FIG. 2 each of these digits is a binary digit, or bit. Each processing element in such a system is connected to a total of n other processing elements, by n bidirectional data lines.

With the multiprocessor system of FIG. 2, the transfer of data between an arbitrary processing element having a address $(P_1, P_2, \ldots P_i, \ldots P_n)$, and another processing element having address $(Q_1, Q_2, \ldots Q_i, \ldots Q_n)$ where $1 \leq i \leq n$ and each of P and Q is either 0 or 1, is performed by transferring the data through successively selected processing elements, with the addresses of these successively selected processing elements being determined by altering one bit of the address of the last selected processing element to thereby obtain the address of the processing element to be next selected, with these bit changes being made in a fixed direction such as to bring the address bits eventually into correspondence with those of the target processing element, i.e. $(Q_1, Q_2, \ldots Q_i, \ldots Q_n)$.

For example, referring to FIG. 2, to transfer a data message from the processing element 47, whose address is (1,0,0,0) to the processing element 42 whose address is (0,0,1,1) the following procedure is executed. Firstly, designating the bits of each processing element as $(P_1, P_2, P_3, P_4)$, it is found that the leading bit $P_1$ of the destination address is 0. Data can be transferred from the processing element 47 to any of the processing elements 48, 49, 51 and 39. However of these, only processing element 39 has a address in which the leading bit is 0. The data are therefore first transferred to the processing element 39, whose address is (0,0,0,0). This is done by making a one-bit change in the address of the processing element 47. Next, since the second bit $P_2$ of the destination address is 0, which is the same as that of the processing element 39, the third bit $P_3$ of the destination address is examined. This is 1, and so the next processing element to be selected is processing element 41, in whose address (0,0,1,0) the third bit is 1. Next, since the fourth bit $P_4$ of the destination address is 1, this address is selected by changing the fourth bit of the address of processing element 41 to 1. Data are then transferred to the destination processing element 42, with address (0,0,1,1). In this way, successive data transfer operations are executed by successive one-bit address changes, each of which brings the current address closer to the destination address. In this example, a total of three successive data transfer operations are required, to transmit a message from the source processing element to the destination processing element.

In the worst case for such data transfer, if all of the digits of the source and destination addresses are mutually different, a total of n transfer operation will be required. In addition with such a prior art multiprocessor system, a total of n data lines are connected to each processing element. Taking the general case of a base-2 system, in which the system has $N = 2^n$ processing elements, the maximum number of data transfer operations required between a source processing element and a destination processing element will be log $N$/log 2 (=n), and the total number of data lines is equal to $\{(\log N/\log 2) \times N\}$ (=n×N).

In the more general case of a base-R multiprocessor system in which the total number of processing elements $N = R^n$, the maximum number of data transfer operations will be log $N$/log $R$ (=n), and the total number of data lines will be:

$$\{(\log N/\log R) \times N \times (R-1)\} \ (= n \times N \times (R-1)).$$

Thus with such a prior art multiprocessor system in which communication must be established between a total of N (=$R^n$) processing elements, the number of bidirectional data lines which must be provided is proportional to $N \times \log N \times (R-1)$, if the maximum number of data transfer operations required to communicate between two arbitrary processing elements is to be limited to a value no greater than n. In the prior art, it is not possible to reduce this required number of data lines.

Such a prior art multiprocessor system has the disadvantage that it is necessary to provide bidirectional data lines between respective processing elements. Thus, the cost of the system hardware is high, e.g. due to the need to provide a plurality of bidirectional data input/output ports on each of the processing elements.

SUMMARY OF THE INVENTION

To overcome the disadvantages of the prior art set out above, it is an object of the present invention to provide a multiprocessor system whereby a number of data lines required for interconnecting the processing elements of the system can be reduced by comparison with the prior art, and further whereby only unidirectional data lines are required.

To achieve the above objectives, a multiprocessor system according to the present invention comprises:

a set of $R^n$ processing elements, where R is an integer which is greater than one, and n is a non-zero integer, each of the processing elements being identified by an address comprising n digits, each of the digits having a value in the range 0 to (R−1);

and a set of unidirectional data lines for interconnecting the processing elements, each of the unidirectional data lines being connected to provide unidirectional communication from one of the processing elements to another one of the processing elements;

in which an arbitrary one of the processing elements having an address $(P_1, P_2, \ldots P_i, \ldots P_{n-1}, P_n)$, where $P_1$ to $P_n$ denote respective address digits and the position i of a digit $P_i$ relative to a leading position in the address is fixedly established as a value in the range 1 to n, is coupled by a set of R ones of the unidirectional data lines to a set of R ones of the processing elements for unidirectional communication to the set of R processing elements, and in which respective addresses of the set of R processing elements are determined in relation to the address of the arbitrary processing element by executing a cyclic one digit left shift operation of the digits of the address $(P_1, P_2, \ldots P_i, \ldots P_{n-1}, P_n)$ to obtain an address $(P_2, P_3, \ldots P_i, \ldots P_1)$, or by executing a cyclic one digit right shift operation of the digits of the address $(P_1, P_2, \ldots P_i, \ldots P_{n-1}, P_n)$ to obtain an address $(P_n, P_1, \ldots P_i, \ldots P_{n-2}, P_{n-1})$, and replacing the digit $P_i$ by respective ones of values in the range 0 to $(R-1)$.

DESCRIPTION OF PREFERRED EMBODIMENTS

Figure 1:
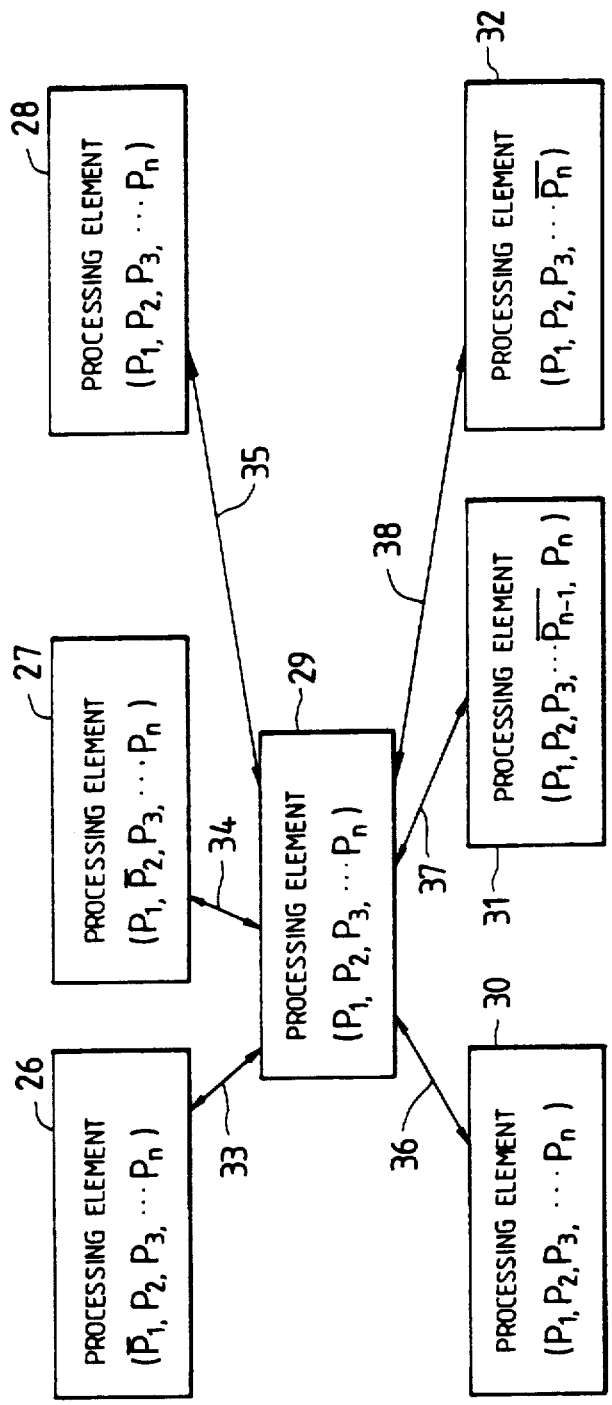
FIG. 1 is a block diagram showing a portion of a generalized prior art multiprocessor system.
Figure 2:
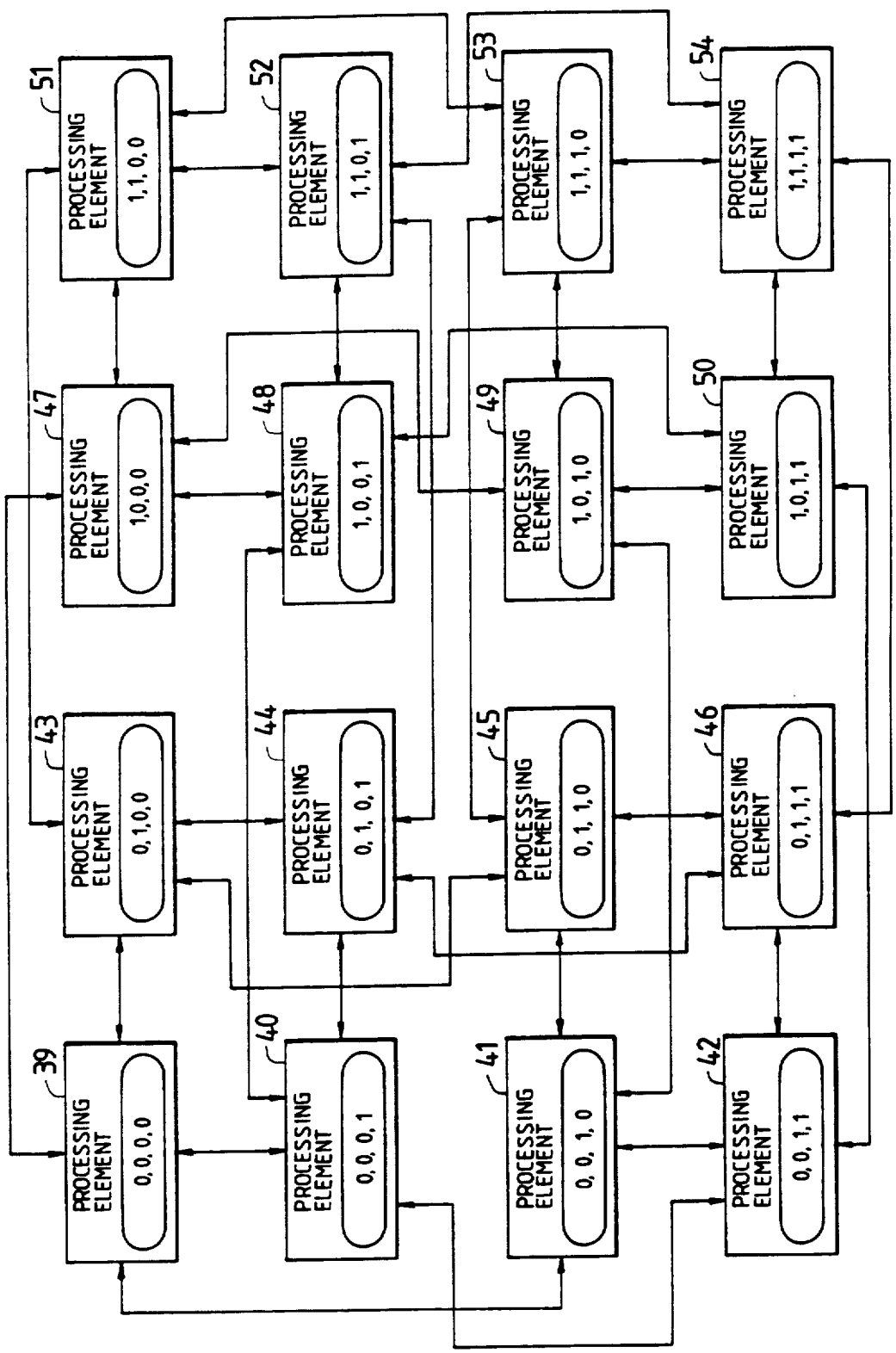
FIG. 2 is a block diagram of a specific example of a prior art/multiprocessor system.
Figure 3:
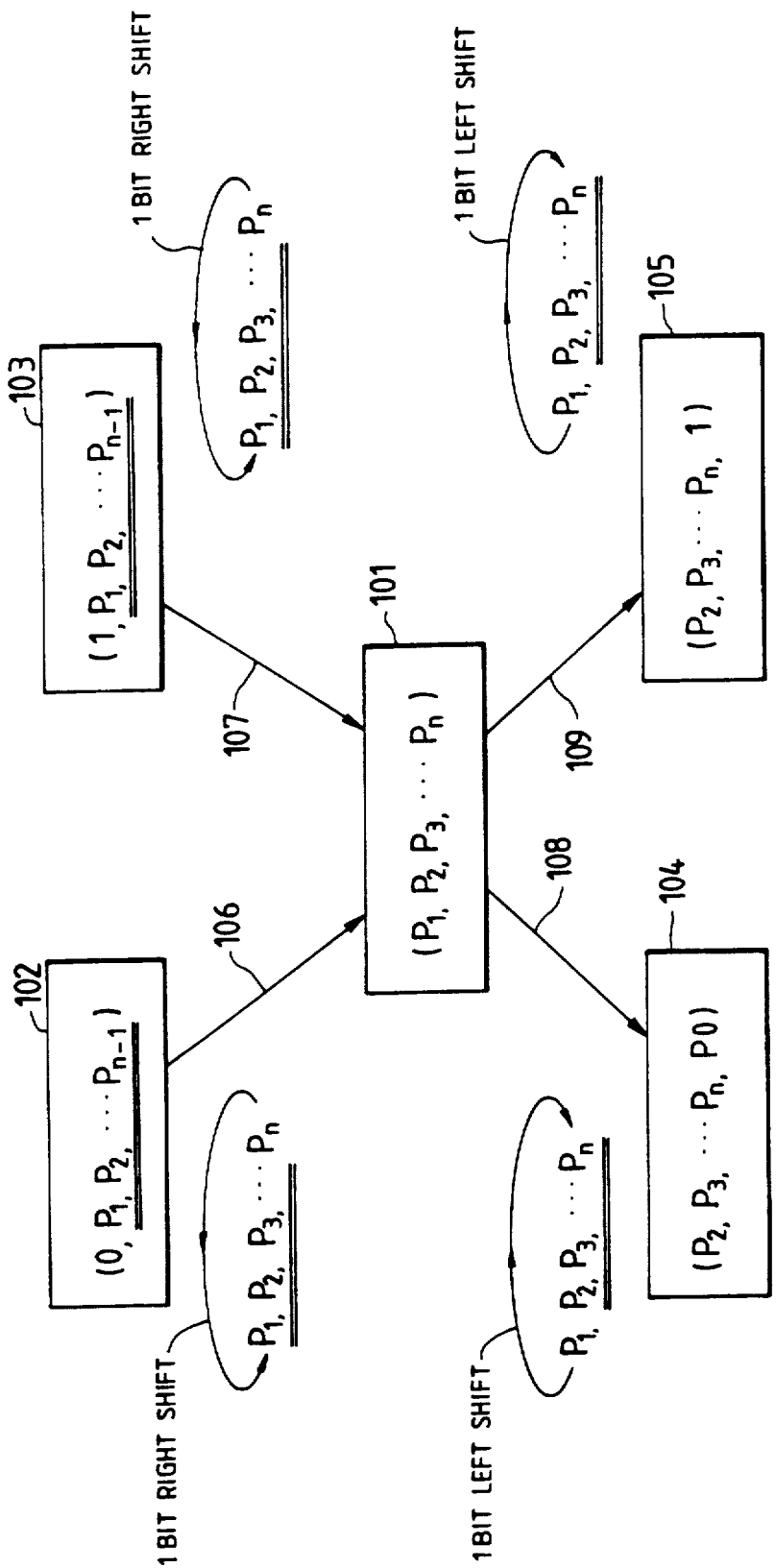
FIG. 3 is a block diagram showing a portion of an embodiment of a multiprocessor system according to the present invention; and, FIG. 4 is a block diagram of a embodiment of the a multiprocessor system according to the present invention having 16 processing elements.

FIG. 3 is a partial block diagram of an embodiment of multiprocessor system according to the present invention, for describing the basic principles of such a system. Numerals 101 to 105 denote respective processing elements, which are interconnected by data lines 106 to 109. Each of the data lines 104 to 109 is unidirectional. The term "unidirectional data line" as used in the following signifies a communication link which connects an output (e.g. a data output port) of a first processing element to an input (e.g. a data input port) of a second processing element, for transferring data from the first to the second processing element. In the case of serial data transmission, each data line can of course be configured as a single communication line, but the invention is not limited to such a type of data line.

In this example, an arbitrary processing element 101 is coupled to receive data from two processing elements 102 and 103 and to send data to two processing elements 104 and 105. The relationships between the addresses of the processing elements 101 to 105 will be described, assuming for simplicity of description that this is a base-2 system in which each digit of a address is a bit. The bits of the address of processing element 101 can be expressed as $(P_1, P_2, P_3, \ldots P_n)$, as shown. The address of processing element 104, which is coupled to receive data from processing element 101, is established by first executing a cyclic one-digit left shift operation on the digits of the address of processing element 101, (to thereby bring the digit $P_1$ to the position formerly occupied by $P_n$, shifting digit $P_n$ to the $P_{n-1}$ position, and so on) and then discarding the digit $P_1$ and replacing this by one of the two possible binary values (0 and 1). In this example, the value 0 is selected. Thus, the address of processing element 104 is established as $(P_2, P_3, \ldots P_n, 0)$. The address of processing element 105 is similarly established, but with a different binary value (i.e. 1) being selected to replace the $P_1$ digit, so that the processing element 105 address is $(P_2, P_3, \ldots P_n, 1)$.

As a result of this relationship between the addresses of processing element 101 and each of the processing elements 104, 105 which are coupled to receive data from processing element 101, the relationship between the address of processing element 101 and the addresses of the processing elements 102 and 103 are in accordance with an inverse shifting operation, as indicated. That is, the address of each of processing elements 102, 103 is obtained by executing a cyclic 1-digit right shift operation on the digits $(P_1, P_2, \ldots P_n)$ of processing element 101, then replacing the digit $P_n$ (shifted to the leading bit position) by one of the two possible binary values 0 and 1. In this way, the address of processing element 102 is established as $(0, P_1, P_2, \ldots P_{n-1})$, and that of processing element 103 as $(1, P_1, P_2, \ldots P_{n-1})$.

It should be noted that the present invention is not limited to a base-2 multiprocessor system. If for example the base R were equal to 4, then there would be four possible values for each address digit. In this case, there could be four processing elements coupled to receive data from the processing element 101 by respective unidirectional data lines, with these processing elements having respective addresses $(0, P_1, P_2, \ldots P_{n-1})$, $(1, P_1, P_2, \ldots P_{n-1})$, $(2, P_1, P_2, \ldots P_{n-1})$, and $(3, P_1, P_2, \ldots P_{n-1})$.

It should also be noted that although in the above description the leading digit $(P_1)$ of the address of processing element 101 is eliminated after a cyclic 1 bit left shift operation and replaced by a specific one of the possible address digit values (0 or 1) to determine the address of a processing element (104 or 105) which receives data from processing element 101, the invention is not limited to utilizing the leading digit $P_1$ for this purpose. It is equally possible to utilize one of the other digits $P_2$ to $P_n$ for this purpose.

It should also be noted that the invention is not limited to executing a 1 digit cyclic left shift operation on the address digits of an arbitrary processing element, in the process of determining the respective addresses of processing elements that are coupled to receive data from that arbitrary processing element over respective unidirectional data lines. It would be equally possible to execute a 1 digit cyclic right shift operation for that purpose. Generally speaking, the result of a one-digit left shift operation of the address $(P_1, P_2, \ldots P_i, \ldots P_{n-1}, P_n)$ of an arbitrary processing element, where i is a value in the range 1 to n designating an arbitrary position relative to the leading position of an arbitrary digit $P_i$, will be to obtain an address $(P_2, P_3, \ldots P_i, \ldots P_n, P_1)$. The respective addresses of a set of R processing elements which are coupled by unidirectional data lines to receive data from that arbitrary processing element are obtained by then replacing the digit $P_i$ of this left-shifted result by respective values in the range 0 to $(R-1)$. Similarly, the result of a one-digit right shift of the address $(P_1, P_2, \ldots P_i, \ldots P_{n-1}, P_n)$ will be an address $(P_n, P_1, \ldots P_i, \ldots P_{n-2}, P_{n-1})$.

Thus with the present invention in general, assuming a multiprocessor system having a base R and $R^n$ processing elements, designating the address of an arbitrary processing element as $(P_1, P_2, \ldots P_i, \ldots P_n)$, where $1 \geq i \geq n$, a total of R processing elements can be coupled to receive data from that arbitrary processing element by respective unidirectional data lines. The addresses of these R processing elements are determined by:

(a) executing a 1-digit cyclic left (or right) shift operation on the digits of the aforementioned arbitrary processing element address, e.g. to obtain a set of digits ($P_1$, $P_2$, ... $P_i$, ... $P_n$, $P_1$) in the case of a left shift, and (b) replacing the digit $P_i$ by each of the possible values which each address digit can take (i.e. in the range 0 to R−1) to obtain the respective addresses of the aforementioned R processing elements.

It can thus be understood that the embodiment of FIG. 3 described hereinabove is only one of various possible embodiments of the invention.

Figure 4:
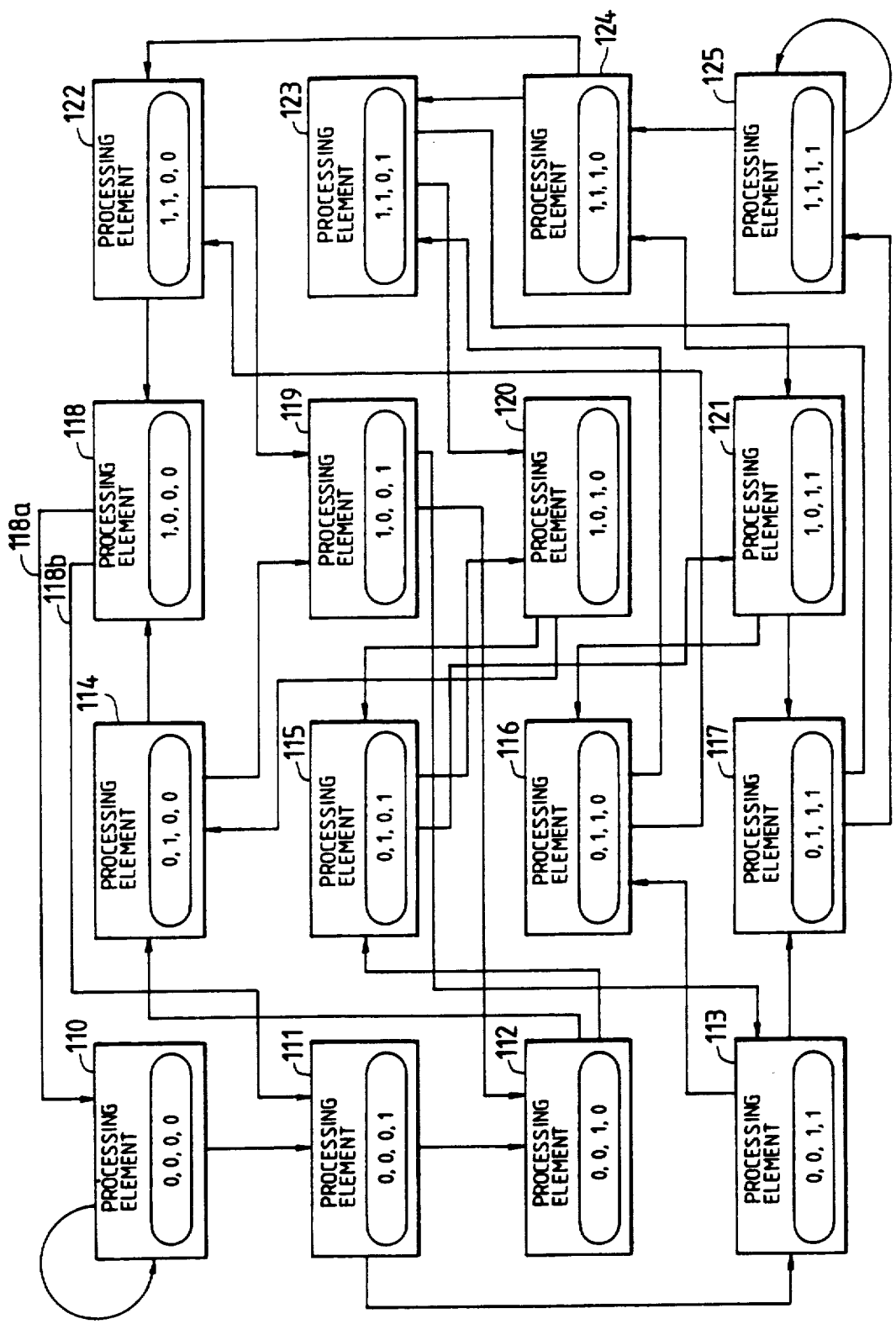

FIG. 4 is an overall block diagram of an embodiment of a multiprocessor system according to the present invention, in which the base R is equal to 2 and the value n is equal to 4, so that the system contains $2^4 = 16$ processing elements, designated by numerals 110 to 125. Since R is 2, each of the processing elements is connected to a pair of unidirectional data lines, for respectively sending data out from the processing element to a pair of processing elements, e.g. the processing element 118 is connected by unidirectional data lines 118a, 118b such as to be capable of sending data to either of the processing elements 110 and 111. The address of processing element 118 is (1,0,0,0) while the respective addresses of processing elements 110 and 111 are (0,0,0,0) and (0,0,0,1), so that it can be understood that the addresses of processing elements 118, 110 and 111 are respectively determined in accordance with the rules for determining such addresses as set out hereinabove.

As a specific example for illustrating the process of unidirectional communication from one processing element to another in the embodiment of FIG. 4, it will be asssumed that data are to be transferred from the processing element 118 whose address is (1,0,0,0) to the processing element 113 whose address is (0,0,1,1). The addresses of the intermediate processing elements through which the data must be sequentially transferred from processing element 118 to 113 are successively determined as follows. There are two possible addresses to which the data can be transferred from processing element 118, i.e. (0,0,0,1) and (0,0,0,0), which have been predetermined in accordance with the rules described above, i.e. by a cyclic 1-digit left-shift of the address digits of the processing element address. First, the address bits of the destination address and the address are compared, and the first and second bits of the destination address and the third and fourth bits of the address found to be identical (each is 0). The address is therefore cyclically left-shifted by one bit, and the fourth bit of the result is made equal to 1, which is the third bit of the destination address. Thus, the first transfer is made to address (0,0,0,1), which is that of processing element 111.

The second, third and fourth bits of this address of processing element 111 are identical to the first, second and third bits respectively of the destination address (0,0,1,1). The address of processing element 111 is therefore cyclically left-shifted by one bit, and the fourth bit of the result is set to value 1, which is the fourth bit of the destination address. The destination address is thereby arrived at as the address to which the next data transfer is to be executed.

In the above, sets of bits which are double-underlined are bits which are mutually identical in the address of the currently selected processing element and the address of the destination processing element. The bits which are indicated by a single underline have been set (to either 0 or 1) as the fourth bit following a cyclic 1-bit left shift operation.

It can thus be seen that in this case only two data transfer operations are required, i.e.: (1,0,0,0) of processing element 118→(0,0,0,1) of processing element 111→(0,0,1,1) of processing element 113.

It can thus be understood that for certain communication operations, i.e. between two processing elements having sets of two or more adjacent address digits which are mutually identical, an multiprocessor system according to the present invention enables a reduction in the number of data transfer operations to be achieved. In this example, two data transfer operations are required, by comparison with the three data transfer operations required in the prior art example described hereinabove. However in general, a maximum of n data transfer operations will be required for communication between two arbitrary processing elements.

This maximum number of data transfer operations will be illustrated for the embodiment of FIG. 4, i.e. for the case of transferring data from processing element 110 having address (0,0,0,0) to processing element 125 having address (1,1,1,1). This is executed as follows.

Transfer 1. From processing element 110, address (0,0,0,0) to processing element 111, address (0,0,0,1).

Since all of the bits of the address and destination address are mutually different, the first transfer is executed to an address obtained by setting the fourth bit of the address identical to the first bit of the destination address, i.e. to 1.

Transfer 2. From processing element 111, address (0,0,0,1) to processing element 113, address (0, 0,1,1).

The address of processing element 111 is cyclically left-shifted by one bit, and the fourth bit of the result is set equal to 1 (identical to the second bit of the destination address), thereby obtaining the address of processing element 113.

Transfer 3. From processing element 113 to to processing element 117.

The address of processing element 113 is cyclically left-shifted by one bit, and the fourth bit of the result is set equal to 1 (identical to the third bit of the destination address), thereby obtaining the address of processing element 117.

Transfer 4. From processing element 117 to to processing element 125.

The address of processing element 117 is cyclically left-shifted by one bit, and the fourth bit of the result is set equal to 1 (identical to the fourth bit of the destination address), thereby obtaining the destination address of processing element 125, i.e. (1,1,1,1) as the next address to which the data are to be transferred.

With a multiprocessor system according to the present invention having a total of N processing elements, a set of R processing elements are connected to each processing element for unidirectional communication therewith, i.e. to receive data from that processing element. Thus a total of N×R data lines are required, so that the total number of data lines can be reduced by comparison with a prior art multiprocessor system.

Furthermore since only unidirectional communication is required, the hardware cost of a multiprocessor system according to the present invention can be substantially lower than that of a prior art system which employs bidirectional communication.

Although the above invention has been described in the above with reference to embodiments which are based on binary address digits, i.e. in which the base R is equal to 2, and in which the number n is equal to 4, it will be apparent that various other forms of multiprocessor system according to the present invention may be envisaged, in which R and n have different values from these of the described embodiments. It will also be apparent that the method of operation of the invention described above can be readily adapted to such different embodiments, i.e. in general with a specific address digit being set to a value in the range 0 to $(R-1)$ following a left (or right) shift operation, in accordance with the value of a digit of the destination address, to determine the next address to which a data transfer operation must be executed.

What is claimed is:

1. A multiprocessor system comprising:
   a set of $R^n$ processing elements, where R is an integer which is greater than one, and n is a non-zero integer, each of said processing elements being identified by an address comprising n digits, each of said digits having a value in the range 0 to $(R-1)$; and,
   a set of unidirectional data lines for interconnecting said processing elements, each of said unidirectional data lines being connected to provide unidirectional communication from one of said processing elements to another one of said processing elements;
   in which an arbitrary one of said processing elements having an address $(P_1, P_2, \ldots P_i, \ldots P_{n-1}, P_n)$, where $P_1$ to $P_n$ denote respective address digits and the position i of a digit $P_i$ relative to a leading position in said address is fixedly established as a value in the range 1 to n, is coupled by a set of R ones of said unidirectional data lines to a set of R ones of said processing elements for unidirectional communication to said set of R processing elements, and in which respective addresses of said set of R processing elements are determined in relation to said address of said arbitrary processing element by executing a cyclic one digit left shift operation of the digits of said address $(P_1, P_2, \ldots P_i, \ldots P_{n-1}, P_n)$ to obtain an address $(P_2, P_3, \ldots P_i, \ldots P_n, P_1)$ and replacing said digit $P_i$ by respective values in said range 0 to $(R-1)$.

2. A multiprocessor system comprising:
   a set of $R^n$ processing elements, where R is an integer which is greater than one, and n is a non-zero integer, each of said processing elements being identified by an address comprising digits, each of said digits having a value in the range 0 to $(R-1)$; and,
   a set of unidirectional data lines for interconnecting said processing elements, each of said unidirectional data lines being connected to provide unidirectional communication from one of said processing elements to another one of said processing elements;
   in which an arbitrary one of said processing elements having an address $(P_1, P_2, \ldots P_i, \ldots P_{n-1}, P_n)$, where $P_1$ to $P_n$ denote respective address digits and the position i of a digit $P_i$ relative to a leading position in said address is fixedly established as a value in the range 1 to n, is coupled by a set of R ones of said unidirectional data lines to a set of R ones of said processing elements for unidirectional communication to said set of R processing elements, and in which respective addresses of said set of R processing elements are determined in relation to said address of said arbitrary processing element by executing a cyclic one digit right shift operation of the digits of said address $(P_1, P_2, \ldots P_i, \ldots P_{n-1}, P_n)$ to obtain an address $(P_n, P_1, \ldots P_i, \ldots P_{n-2}, P_{n-1})$ and replacing said digit $P_i$ by respective values in said range 0 to $(R-1)$.

* * * * *